No. 695,532. Patented Mar. 18, 1902.
C. H. BICALKY.
WHEEL.
(Application filed Mar. 5, 1901.)
(No Model.) 2 Sheets—Sheet 1.
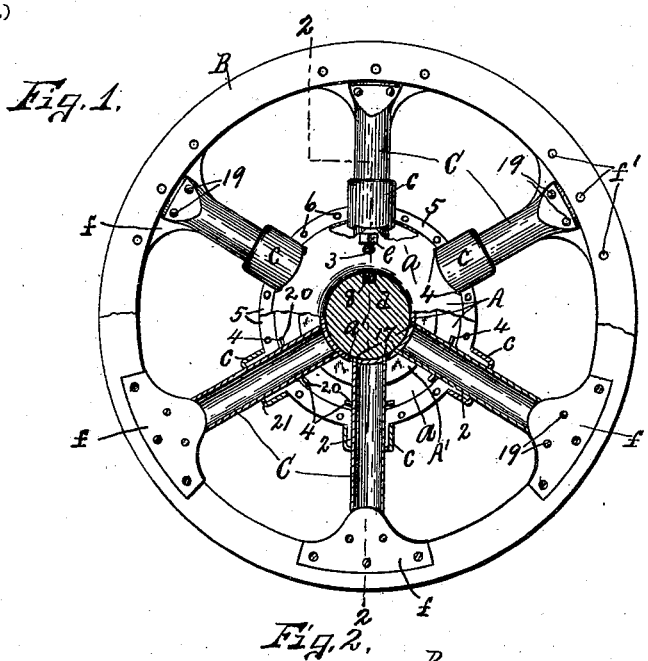
Fig. 1.
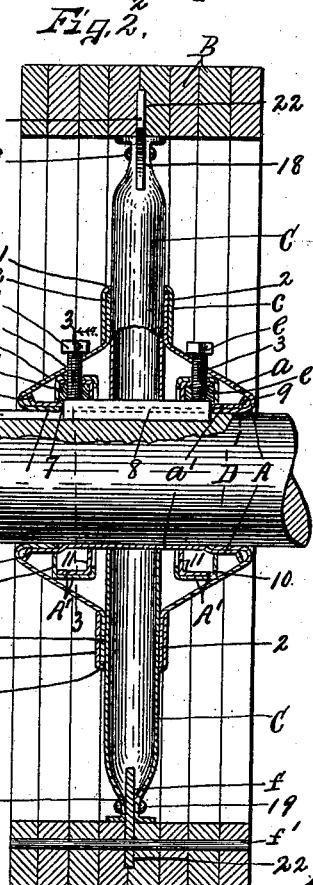
Fig. 2.
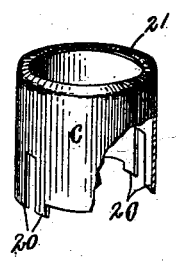
Fig. 4.
Fig. 3.
WITNESSES:
F. E. Arthur.
H. B. Chase.
INVENTOR
Charles H. Bicalky
BY
Smith & Drinson
ATTORNEYS.
THE NORRIS PETERS CO., PHOTO-LITHO., WASHINGTON, D. C.

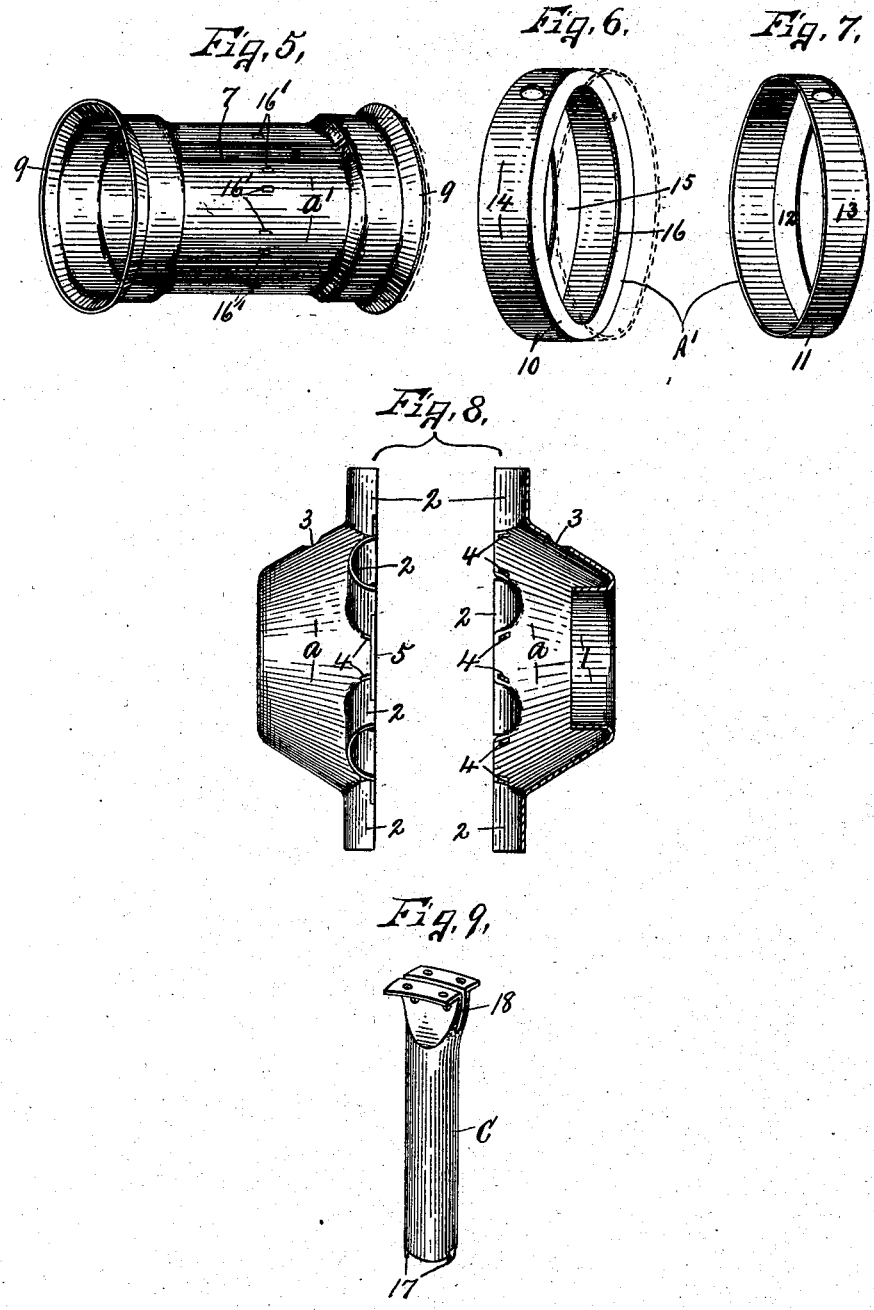

UNITED STATES PATENT OFFICE.

CHARLES H. BICALKY, OF ONEIDA, NEW YORK.

WHEEL.

SPECIFICATION forming part of Letters Patent No. 695,532, dated March 18, 1902.

Application filed March 5, 1901. Serial No. 49,963. (No model.)

*To all whom it may concern:*

Be it known that I, CHARLES H. BICALKY, of Oneida, in the county of Madison, in the State of New York, have invented new and useful Improvements in Wheels, of which the following, taken in connection with the accompanying drawings, is a full, clear, and exact description.

This invention relates to improvements in wheels, and more particularly to pulleys.

The object of this invention is to produce a light, strong, and durable wheel the hub and spokes of which are formed of sheet metal and are used in combination with a wood rim made up of a series of annular sections secured together face to face.

The further object of my invention is to so construct and arrange the several parts as to permit them to be readily assembled and adapted for use with any size of rim, or by removing or omitting said rim the hub and spokes may be used as a hand-wheel for any desired purpose.

A still further object of this invention is to afford a long bearing for the spoke within the hub, thereby permitting the use of very light tubular metal for the spokes.

To this end the invention consists in the construction, combination, and arrangement of the parts of a wheel, as hereinafter fully described, and pointed out in the claims.

Referring to the drawings, Figure 1 is a side elevation, partly in section, of a wheel embodying my invention. Figs. 2 and 3 are sectional views taken, respectively, on line 2 2, Fig. 1, and 3 3, Fig. 2. Fig. 4 is an isometric view of one of the detached sleeves encircling one of the spokes for locking the sheet-metal hub-sections together. Figs. 5, 6, and 7 are isometric views, respectively, of the detached inner shell of the hub and the outer and inner sheet-metal sections of one of the collars encircling said inner shell. Fig. 8 represents the opposite sections of the outer shell, one of said sections being shown in elevation and the other in section, said sections being shown as separated from each other. Fig. 9 is an isometric view of one of the detached spokes of my improved wheel.

Similar reference characters indicate corresponding parts in all the views.

My invention consists, essentially, of a hub A, a rim B, and spokes C, all of which parts are of particular construction, hereinafter described, and mounted upon a suitable shaft D, having a keyway $d$.

The hub A preferably consists of an outer shell composed of oppositely-arranged sheet-metal sections $a\,a$ and an inner shell $a'$, also formed of sheet metal, the sections $a\,a$ being preferably formed substantially concavo-convex in cross-section and the inner shell usually consisting of a sheet-metal cylinder arranged within the outer shell. The sections $a\,a$ of the outer shell preferably consist of truncated sheet-metal cones having shaft-openings through their truncated ends, which are preferably provided with inturned annular flanges 1, adapted to fit closely upon the shaft D, said annular flanges 1 being coaxial with said shaft and extending inwardly toward each other a limited distance for forming an annular space between their inner ends. The adjacent meeting ends of the sections $a\,a$ are provided with a series of substantially radial concavo-convex arms 2, which are usually semicylindrical in form and extend beyond the body of the hub for forming a series of annular nipples, which are adapted to receive the spokes C, presently described. These sections $a\,a$ are provided with suitable set-screw openings 3 through their inclined peripheral walls at the opposite sides of their meeting edges or faces and are also formed with apertures 4 in proximity to the bases of the nipples 2 for a purpose hereinafter mentioned. In order to permit the sections $a\,a$ to be readily clamped together, I usually provide the meeting edges of said sections with outwardly-projecting flanges 5, having apertures therein for receiving suitable fastening members, as rivets 6.

The inner shell $a'$, previously mentioned, encircles the inwardly-projecting annular flanges 1 of the outer shell of the hub and is provided with a lengthwise key-opening 7 for receiving a suitable key 8, and its outer ends are preferably flared outwardly for forming annular shoulders 9, which are adapted to engage the inner faces of the opposite ends of the sections $a\,a$. The intermediate portion of the cylindrical shell $a'$ is preferably of less diameter than its opposite ends, the inner face of said intermediate portion being of substantially the same diameter as the inner diameter of the annular flanges 1 and is adapted to engage the shaft D for forming an additional bearing for the hub. The keyway or opening 7 is preferably formed of substantially the same length as the distance between the inner ends of the flanges 1, and the key 8 is formed of substantially the same length as the key-opening and usually extends on opposite sides of the meeting edges of the hub-sections, said key-opening and key being usually alined with the set-screw openings 3 of the hub-sections $a$ $a$ and are extended laterally beyond said set-screw openings. The annular shoulders 9 of the inner shell $a'$ serve to hold the inner shell rigidly from endwise movement and also tend to reinforce the adjacent portions of the sections $a$ $a$.

Interposed between the opposite ends of the outer and inner shells $a$ and $a'$ are suitable reinforcing-collars $A'$, which encircle the opposite ends of the inner shell $a'$ at opposite sides of the meeting edges of the hub-sections $a$, and each consists of an outer sheet-metal ring 10 and an inner sheet-metal ring 11, said rings being each formed with an axial opening for receiving the inner shell $a'$ and with set-screw openings for receiving a suitable set-screw $e$, movable in the opening 3 of the hub-sections $a$. The inner ring 11 usually consists of side and peripheral walls 12 and 13, and the outer ring is provided with an inclosing peripheral wall 14 and side walls or flanges 15 and 16, lapped upon the lateral sides of the inner ring for holding said inner ring firmly in position and preventing its lateral displacement.

$e'$ represents a threaded member, as a nut, arranged within the inner ring 11 and interposed between its peripheral wall and the inner shell $a'$, the threaded apertures of said nuts being extended entirely therethrough and alined with the opposite ends of the key 8. This key 8 is arranged in the keyway $d$ and is thereby interlocked with the shaft D, and the set-screws $e$ are movable in the openings 3 through the apertures provided in the rings 10 and 11 and are engaged with the threaded members $e'$ and with the opposite ends of the key 8.

It is thus apparent from the foregoing description that the set-screws $e$, engaged with the threaded members $e'$, are adapted to engage the key 8, and thereby firmly lock the hub to the shaft D.

The intermediate portion of the inner shell $a'$ is formed with a series of apertures 16', adapted to receive shoulders provided on the inner ends of the spokes previously mentioned.

The spokes C preferably consist of sheet-metal tubes inserted through the nipples or spoke-openings of the outer hub-shell, the inner ends of said spokes being engaged with the peripheral face of the inner shell $a'$ and are provided with shoulders 17, projecting into or through the apertures 16' of said inner shell and may be upset or riveted against the walls of the opening for holding the inner ends of the spokes from lateral or radial movement or displacement, and the outer ends of the spokes terminate at the inner face of the rim and form a suitable abutment for said rim. The outer ends of the spokes extend beyond the nipples of the outer hub-shell, are preferably flattened or drawn together and flanged outwardly at their outer extremities for forming a broad or flat bearing-face abutting against the inner face of the rim, and are provided with circumferential slots 18, in which are arranged suitable stiffening-plates $f$, secured to the spokes by fastening means, as rivets 19. The semi-annular arms 2 of the hub-sections $a$ $a$ encircle the intermediate portions of the spokes and are locked together by sleeves $c$, encircling said arms and having their inner ends provided with shoulders 20, arranged to enter the apertures 4 of the hub-sections $a$ $a$, said shoulders 20 being bent or riveted against the adjacent walls of the hub-sections $a$ $a$ for firmly holding the sleeve in position, the outer ends of said sleeves being provided with annular shoulders 21, engaged with the end faces of the arms 2 and also engaging the periphery of the spokes C.

It is obvious from the foregoing description that the sleeves $c$ serve not only to lock the meeting edges of the hub-sections $a$ to each other, but also reinforce the arms 2, that by extending the inner ends of the spokes so as to engage the periphery of the inner shell $a'$ and interlocking the shoulders at the ends of said spokes with said inner shell the spokes and hub are materially strengthened, and that a much lighter grade of sheet metal may be employed in the construction of the hub and spokes than would be the case if the spokes only extended into the nipples or terminated at the inner ends of said nipples formed by the arms 2. It is also apparent that by providing the sleeve $c$ with an annular flange or shoulder engaged with the end face of the arms 2 and then riveting or clenching the shoulders 20 upon the inner face of the sections $a$, said sleeve is held firmly in position and adds greatly to the strength and rigidity of the hub and spokes.

The rim B is preferably formed of wood made up of a series of annular layers arranged face to face and secured together in any desired manner and is formed with a series of recesses 22, extending outwardly from their inner faces for receiving the outer ends of the plates $f$, which extend beyond the outer ends of the spokes C and are preferably formed of greater circumferential length than the width of said spokes in order to form a brace for the outer ends of the spokes and stiffen the connection between the spokes and rim.

In assembling the parts of my invention the inner rings of the collars $A'$ are formed substantially as described and as seen at Fig. 7, the outer ring of said collar being formed with its side wall or flange 16 extended laterally, as seen by dotted lines in Fig. 6. The inner ring is then inserted into the outer ring and the side wall or flange 16 is turned inwardly, as previously described and as seen in full lines in Fig. 6. The collars are then slipped over one end of the inner shell $a'$ before the same is expanded for forming the flange 9 and the adjacent enlarged portion of the shell, and after these collars are placed in position said end is expanded, as seen by full lines in the drawings. After this operation the opposite sections $a$ $a$ are telescoped with the opposite ends of the inner shell, and their meeting edges are suitably secured together in the manner previously mentioned. The spokes are then inserted between the arms 2, with their inner ends engaged with the periphery of the inner shell and the shoulders 17 registered with the apertures 16', the sleeves $c$ being previously slipped over the ends of the arms 2 and secured to the outer shell of the hub, and the plates $f$ and rim B are then secured to the outer ends of the spokes, said plates being held in position by suitable transverse rods or fastening members $f'$.

The operation of my invention will now be readily understood upon reference to the foregoing description and the accompanying drawings, and it will be noted that some change may be made in the form and arrangement of the parts of my invention without departing from the spirit thereof.

Having fully described my invention, what I claim, and desire to secure by Letters Patent, is—

1. A wheel comprising a hub and rim, tubular spokes having their inner ends secured to the hub and their outer ends terminating in a flange at the inner face of the rim, and sheet-metal plates secured to the rim and to the adjacent ends of the spokes.

2. A wheel comprising a hub and rim, tubular spokes having their inner ends secured to the hub and their outer ends flanged against the inner face of the rim, said flanged ends of the spokes being provided with slots, and plates secured to the rim and projecting into the slots and secured to the spokes.

3. In a wheel, a hub composed of opposite concavo-convex sections arranged base to base and formed with recesses in their meeting faces for forming spoke-openings, in combination with spokes inserted in the openings, and sleeves surrounding the spokes and interlocked with the sections of the hub.

4. The combination with a wheel-hub consisting of opposite sheet-metal sections arranged end to end and having their meeting faces provided with substantially radial arms or flanges for forming nipples, of metal sleeves inclosing the arms or flanges for locking said sections together.

5. In a wheel, a hub comprising hollow sheet-metal sections arranged end to end and provided with substantially radial arms having recesses in their meeting faces for forming spoke-openings, in combination with spokes inserted in the openings, and sleeves inclosing the arms and adjacent portions of the spokes and secured to the hub-sections.

6. In a wheel, a hub comprising hollow sheet-metal sections arranged end to end and provided with substantially radial arms having recesses in their meeting faces for forming spoke-openings, in combination with tubular spokes inserted in the openings, and sleeves encircling the arms of the hub and secured to the hub-sections for locking the sections together and holding the spokes in position.

7. The herein-described hub for wheels consisting of opposite concavo-convex sheet-metal sections secured base to base and provided with concavo-convex substantially radial arms at their bases for forming hollow nipples in combination with tubular sleeves encircling the nipples for holding the sections base to base.

8. The herein-described hub for wheels consisting of opposite concavo-convex sheet-metal sections secured base to base and provided with concavo-convex substantially radial arms at their bases for forming hollow nipples in combination with tubular sleeves encircling the nipples and provided with annular shoulders engaging the end faces of the nipples.

9. The herein-described hub for wheels consisting of opposite concavo-convex sheet-metal sections secured base to base and provided with concavo-convex substantially radial arms at their bases for forming hollow nipples, said sections being formed with apertures in proximity to the bases of the nipples, in combination with sheet-metal sleeves encircling the nipples, and provided with shoulders extending into the apertures.

10. A wheel-hub composed of concavo-convex sheet-metal sections arranged base to base and having peripheral concavo-convex arms or flanges opening from their meeting faces, said sections being formed with apertures in their walls adjacent to the arms or flanges, in combination with sheet-metal sleeves inclosing the arms or flanges and having their inner ends engaged with the peripheries of the sections and formed with shoulders extending through the apertures, the outer ends of the sleeves being provided with annular flanges engaged with the outer end faces of the arms of the hub-sections.

11. In a wheel, a hollow sheet-metal hub provided with a shaft-opening and having its opposite ends formed with inturned annular flanges, in combination with a shaft and a key locked to the shaft and projecting between the inner edges of the inturned flanges.

12. In a wheel, a hollow sheet-metal hub provided with shaft and set-screw openings and having its opposite ends formed with inturned annular flanges, in combination with a threaded member inside the hub, a set-screw movable in the opening therefor and engaged with the threaded member, a shaft, and a key adapted to be forced into engagement with the set-screw for locking the hub to the shaft.

13. A wheel-hub comprising concavo-convex sheet-metal sections arranged base to base and having their outer ends open and provided with inturned annular flanges, said sections being each formed with semi-annular arms or flanges adapted to form hollow peripheral nipples, and sleeves inclosing the arms or flanges and secured to the hub-sections.

14. In a wheel, a hub comprising sheet-metal shells arranged one within the other, the outer shell being provided with substantially radial openings, in combination with spokes arranged in the openings and having their inner ends engaged with the inner shell.

15. In a wheel, a hub comprising sheet-metal shells arranged one within the other, the outer shell being provided with substantially radial openings, in combination with spokes arranged in the openings and having their inner ends engaged with the inner shell, and a rim secured to the outer ends of the spokes.

16. A wheel-hub comprising an outer shell composed of concavo-convex sheet-metal sections arranged base to base and provided with a shaft-opening and substantially radial spoke-openings, and a second shell arranged within the former shell concentric with the shaft-opening, in combination with spokes inserted through the spoke-openings and having their inner ends engaged with the periphery of the inner shell.

17. In a wheel, a hub comprising sheet-metal shells arranged one within the other, the outer shell being provided with substantially radial openings, in combination with tubular spokes inserted through the radial openings and having their inner ends engaged with the inner shell.

18. A wheel-hub comprising sheet-metal shells arranged one within the other, the inner shell being formed with a key-opening, in combination with a shaft having a key-seat, and a key arranged in the seat and projecting into the key-opening of the inner shell.

19. A wheel-hub comprising sheet-metal shells arranged one within the other, the inner shell being formed with a key-opening, in combination with a shaft having a key-seat, a key arranged in the seat and projecting into the opening therefor, a threaded member between the shells, and a set-screw engaged with the threaded member and key for the purpose set forth.

20. The combination with a shaft and the hub of a wheel, a hollow sheet-metal ring encircling the shaft and provided with a set-screw opening, a threaded member between the shaft and ring, a key for engaging the shaft, and a set-screw engaged with the threaded member and key.

21. The combination with a shaft and the hub of a wheel, sheet-metal rings arranged one within the other and encircling the shaft, said rings being formed with set-screw openings, a threaded member within said shells, a key for engaging the shaft, and a set-screw engaged with the threaded member and key.

22. In combination with a wheel-hub consisting of sheet-metal shells arranged one within the other, the outer shell being formed with an aperture, a ring encircling the inner shell and provided with an aperture alined with the former aperture, a threaded member between the inner shell and ring, a key for engaging the shaft, and a set-screw passed through said apertures and engaged with the threaded member and key.

23. In a wheel, a hub comprising an outer shell composed of sheet-metal sections arranged end to end and provided with an aperture, a second shell within the former shell and provided with a key-opening, in combination with rings arranged one within the other and each provided with an aperture alined with the former aperture, said rings encircling the inner shell within the outer shell, a key for engaging the shaft, a threaded member interposed between the rings and inner shell, and a set-screw movable in said apertures, and engaged with the threaded member and key.

24. In combination with a wheel-hub consisting of sheet-metal shells arranged one within the other, the outer shell being formed with spoke-openings and the inner shell being provided with apertures, and tubular spokes inserted through the spoke-openings and having their inner ends formed with shoulders extending into the apertures of the inner shell for the purpose set forth.

25. In a wheel, a hub consisting of an outer shell composed of sheet-metal sections arranged end to end and provided with spoke-openings, a second shell within the former shell and formed with apertures, spokes inserted through the spoke-openings of the outer shell and having their inner ends provided with shoulders extending into the apertures.

26. In a wheel, the combination of a hub-shell composed of concavo-convex sheet-metal sections arranged base to base and having their adjacent ends provided with substantially radial concavo-convex arms for forming hollow nipples, the opposite ends of said outer shell being provided with inturned annular flanges, a second hub-shell within the former shell and encircling said annular flanges, said second shell being provided with a key-opening and with flared ends engaging the inner face of the outer shell, a key movable in the opening and adapted to engage the shaft, a collar encircling the inner shell and key within the outer shell, a threaded member within the collar, a set-screw engaged with the threaded member and key, tubular spokes inserted through the radial nipples and having their inner ends engaged with the periphery of the inner shell, and a rim secured to the outer ends of the spokes.

27. The combination with a wheel-hub consisting of opposite sheet-metal sections arranged end to end and secured at their meeting edges, of a ring within the hub having a shaft-opening, and means for locking the hub and ring to each other and to the shaft.

28. The combination with a wheel-hub consisting of opposite sheet-metal sections arranged end to end and secured at their meeting edges, of telescoping rings within the hub provided with shaft-openings, and means for locking the hub and rings to each other and to the shaft.

29. The combination with a wheel-hub consisting of opposite sheet-metal sections arranged end to end and secured at their meeting edges, of a ring within the hub having a shaft-opening, said hub and ring having substantially radial openings alined with each other, a nut within the ring, and a set-screw arranged in said radial openings and engaged with the nut for locking the hub and ring together.

In witness whereof I have hereunto set my hand this 27th day of February, 1901.

CHARLES H. BICALKY.

Witnesses:
   HARRISON W. COLEY,
   ARTHUR W. SMITH.